United States Patent
Ellison et al.

(10) Patent No.: US 9,311,944 B2
(45) Date of Patent: Apr. 12, 2016

(54) RECORDING HEAD WITH PIEZOELECTRIC CONTACT SENSOR

(71) Applicant: Seagate Technology LLC, Cupertino, CA (US)

(72) Inventors: David J. Ellison, Minneapolis, MN (US); Michael Christopher Kautzky, Eagan, MN (US); Jorge Hanchi, St. Louis Park, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 69 days.

(21) Appl. No.: 14/070,066

(22) Filed: Nov. 1, 2013

(65) Prior Publication Data

US 2015/0124355 A1    May 7, 2015

(51) Int. Cl.
  G11B 21/02    (2006.01)
  G11B 5/60     (2006.01)

(52) U.S. Cl.
  CPC ............ *G11B 5/6076* (2013.01); *G11B 5/6058* (2013.01)

(58) Field of Classification Search
  None
  See application file for complete search history.

(56) References Cited

U.S. PATENT DOCUMENTS

| | | | | |
|---|---|---|---|---|
| 4,814,907 | A | * | 3/1989 | Goor ................................ 360/75 |
| 5,034,648 | A | * | 7/1991 | Gastgeb ........................ 310/330 |
| 5,082,827 | A | * | 1/1992 | Barnes ............................ 360/75 |
| 5,780,727 | A | * | 7/1998 | Gimzewski et al. ............ 73/105 |
| 6,105,432 | A |   | 8/2000 | Taniguchi et al. |
| 8,310,779 | B2 |  | 11/2012 | Hanchi et al. |
| 8,451,696 | B2 |  | 5/2013 | Huang et al. |
| 2003/0104658 | A1 | * | 6/2003 | Furukawa et al. ............ 438/151 |
| 2008/0259480 | A1 | * | 10/2008 | Pham et al. ...................... 360/25 |
| 2011/0032642 | A1 | * | 2/2011 | Kautzky et al. ............ 360/246.2 |
| 2013/0107390 | A1 |  | 5/2013 | Huang et al. |
| 2013/0107680 | A1 |  | 5/2013 | Contreras et al. |

OTHER PUBLICATIONS

Shen et al., "Simulation of Contact Sensor in the Thermal Flying Height Control Slider", ASME Information Storage and Processing Systems Conference, 2011, 3 pages.
Wu et al., "Metal Piezoelectric Semiconductor Field Effect Transistors for Piezoelectric Strain Sensors", Applied Physics Letters, vol. 85, No. 7, Aug. 16, 2004, 3 pages.
Dahiya et al., "Piezoelectric Polymer Oxide Semiconductor Field Effect Transistor (POSFET) Devices for Touch Sensing", 2009 2nd International Workshop on Electron Devices and Semiconductor Technology, 5 pages.
Fei et al., "Piezoelectric Potential Gated Field-Effect Transistor Based on a Free-Standing ZnO Wire", Nano Letters, vol. 9, No. 10, American Chemical Society, Sep. 9, 2009, pp. 3435-3439.
Wang et al., "Piezoelectric Field Effect Transistor and Nanoforce Sensor Based on a Single ZnO Nanowire", Nano Letters, vol. 6, No. 12, American Chemical Society, Nov. 22, 2006, pp. 2768-2772.
Yang et al. "Transverse Piezoelectric Field-effect Transistor Based on Single ZnO Nanobelts", Phys. Chem. Chem. Phys., 2010, 12, pp. 12415-12419 (abstract only).

* cited by examiner

*Primary Examiner* — Tan X Dinh
(74) *Attorney, Agent, or Firm* — Hollingsworth Davis, LLC (57) ABSTRACT

Example embodiments include an apparatus that has a piezoelectric contact sensor. The piezoelectric contact sensor includes a semiconductor device having a semiconductor material that defines a channel through which current can flow. The piezoelectric contact sensor also includes a piezoelectric element coupled to the semiconductor material. The semiconductor material is configured to modulate the current channel in response to compressive stress waves at the contact sensor. Other example embodiments include an apparatus that has a slider having an air-bearing surface, a write head integral to the slider, and a piezoelectric contact sensor that includes a semiconductor device and a piezoelectric element.

24 Claims, 6 Drawing Sheets

RECORDING HEAD WITH PIEZOELECTRIC CONTACT SENSOR

SUMMARY

Example embodiments are directed to an apparatus having a piezoelectric contact sensor of a recording head that includes a semiconductor device and a piezoelectric element. The semiconductor device includes a semiconductor material that defines a channel through which channel current can flow. The piezoelectric element is coupled to the semiconductor device. The piezoelectric element is configured to modulate the channel current in response to compressive stress waves at the contact sensor. In some embodiments, the piezoelectric contact sensor can extend beyond an air-bearing surface and can act as a contact pad that can protect read heads, write heads, or both.

Other example embodiments are directed to an apparatus that includes a slider of a recording head having an air-bearing surface and a write head integral to the slider. The apparatus also includes a piezoelectric contact sensor proximal to the slider. The piezoelectric contact sensor includes a semiconductor material that defines a channel through which channel current can flow. The piezoelectric contact sensor also includes a piezoelectric element coupled to the semiconductor material that is configured to modulate the channel current in response to compressive stress waves.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Data storage systems commonly include one or more recording heads that write and read information to and from a recording medium. A relatively small distance or spacing is maintained between a recording head and its associated media. This distance or spacing is known as "fly height" or "head-media spacing." By reducing the head-media spacing, a recording head is typically better able to both write and read data to and from a medium. Reducing the head-media spacing may also allow for surveying of recording medium topography, such as for detecting asperities, voids, and other features of the recording medium surface. Head-media contact detection and/or head-media spacing sensing technologies are important for the performance and reliability of magnetic storage systems. Higher contact detection repeatability enables lower active clearance, and thus higher recording density. Higher contact detection sensitivity can reduce wear and improve reliability of magnetic recording heads. In the present disclosure "recording heads" refer to write heads or read/write heads.

Figure 1:
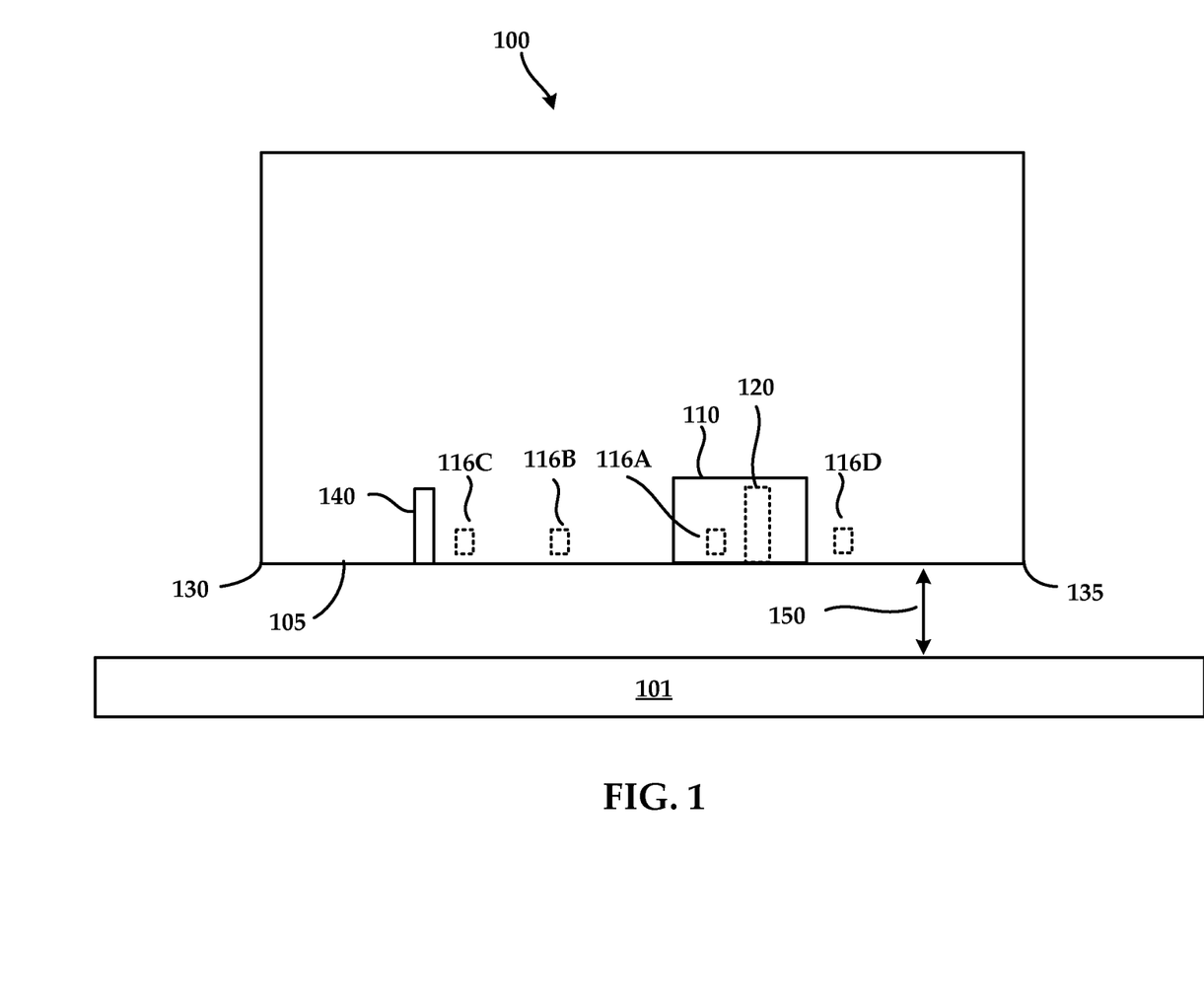
FIG. 1 is a simplified illustration of a piezoelectric contact sensor shown in close proximity to a rotating magnetic storage medium in accordance an example embodiment.

In accordance with various embodiments, and with reference to FIG. 1, recording head 100 is shown in close proximity to magnetic recording medium 101. Distance 150 is the fly height of recording head 100 over magnetic storage medium 101. Recording head 100 includes a number of components, including write head 110, read head 140, and piezoelectric contact sensor (116A, 116B, 116C, or 116D) coupled (and integral) to write head 110. Write head 110 and read head 140 are positioned at or near air bearing surface (ABS) 105 of recording head 100 with read head 140 closer to leading edge 130 than write head 110. In one embodiment, piezoelectric contact sensor 116A is illustrated as within magnetic recording head 100. Piezoelectric contact sensor 116A is located at or near air-bearing surface 105. In some embodiments, piezoelectric contact sensor 116B can be at other locations such as shown in FIG. 1 (dotted lines) between write head 110 and read head 140 (as shown in 116B), closer to read head 140 than write head 110 (as shown in 116C), or in some embodiments such as 116D, outside read head 110 and write head 140 near trailing edge 135.

Figure 2:
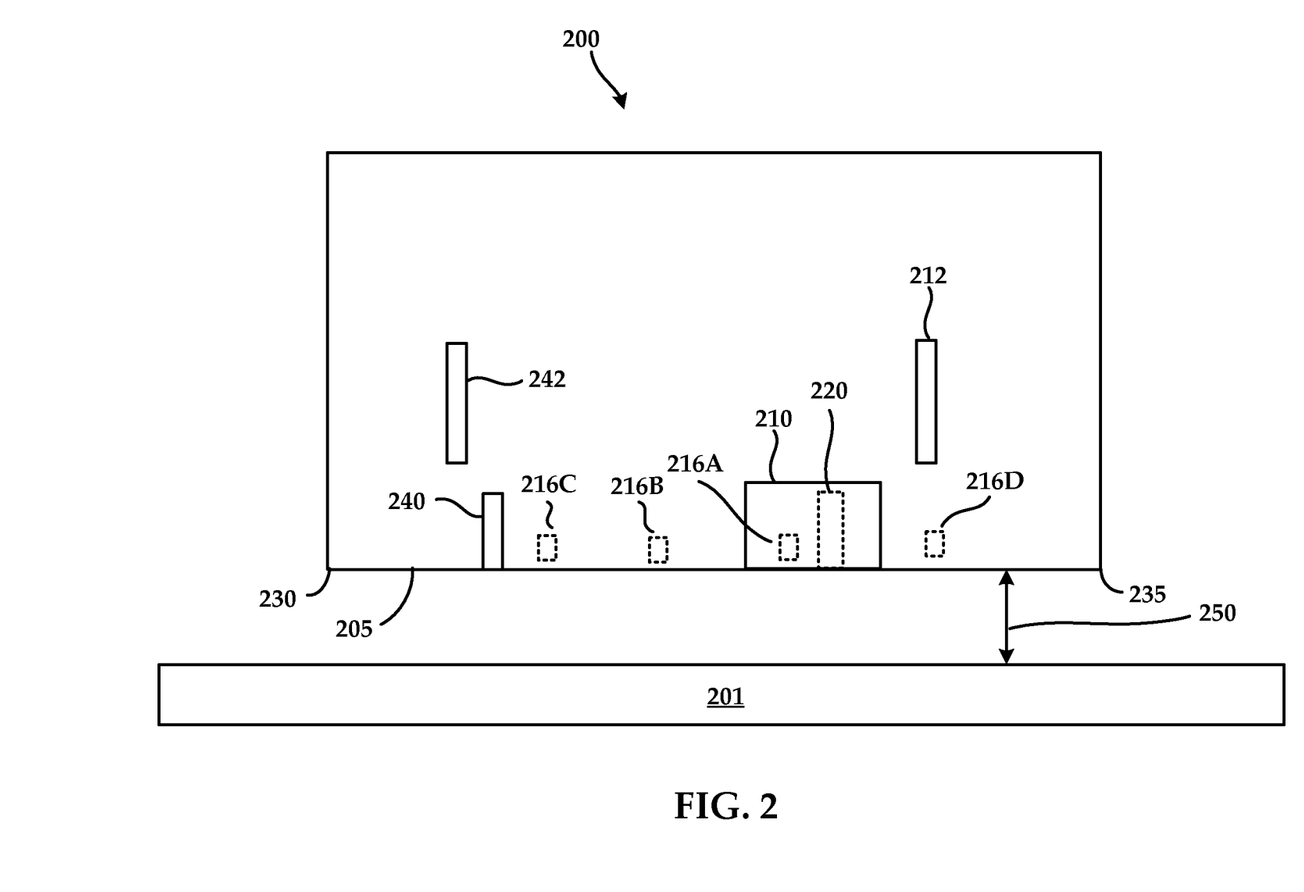
FIG. 2 is a simplified illustration of a piezoelectric contact sensor shown in close proximity to a rotating magnetic storage medium according to another example embodiment.

With reference to FIG. 2, recording head 200 is shown in close proximity to rotating magnetic recording medium 201. Recording head 200 includes a number of components, including write head 210, write head heater (actuator) 212 thermally coupled to write head 210, read head 240, and read head heater (actuator) 242 thermally coupled to read head 240. Write head 210 and read head 240 are positioned at or near an air bearing surface (ABS) 205 of recording head 200. In one embodiment, piezoelectric contact sensor 216A is illustrated as within magnetic recording head 200. Piezoelectric contact sensor 216A is located at or near air-bearing surface 205. Read head 240 is closer to trailing edge 230 than write head 210. In some embodiments, piezoelectric contact sensor 216B can be at other locations such as between write head 210 and read head 214. In some embodiments, piezoelectric contact sensor 216C can be closer to read head 240 than write head 210, or in some embodiments, piezoelectric contact sensor 216D can be located outside the read head 240 and write head 210 near trailing edge 235. Heaters 212 and 242 may be resistive heaters that generate heat in response to passage of electrical current. The thermal energy generated by actuators 212 and 242 can cause thermal expansion of recording head 200, largely expressed at ABS 205. In particular, actuation of write head heater 212 can cause thermal expansion of the writer region of recording head 200, resulting in reduced spacing 250 between write head 210 and magnetic recording medium 201. Similarly, actuation of reader heater 242 can cause thermal expansion of the reader region of recording head 200, resulting in reduced spacing between read head 240 and magnetic recording medium 201. Selectively actuating writer and reader heaters 212 and 242 allows for control of the head-media spacing in a data storage system.

The present disclosure generally relates to magnetic recording devices used for data storage. The embodied magnetic recording devices include an apparatus that has a piezoelectric contact sensor with an air-bearing surface and is configured to magnetically interact with a magnetic recording medium. In embodiments described below, a clearance between a magnetic head (part of the magnetic recording device) and a recording medium can be measured using a piezoelectric contact sensor supported by the recording head. The piezoelectric contact sensor can include a semiconductor device defining a channel through which current can flow (for example, a transistor) and a piezoelectric element coupled to the semiconductor device. The piezoelectric contact sensor can be used for control of the clearance, e.g., used as feedback for an actuator for fine clearance adjustments. The measurements may also be used for contact detection, for example, determining when physical contact between the magnetic head and medium occurs.

Accurate contact detection is desirable for properly setting the clearance or flying height in a magnetic recording device and maximizing the bit error rate (BER) and the amplitude of the read signals. Contact detection schemes currently in use such as, for example, dual-ended temperature coefficient of resistance sensor (thermo-resistive sensor for contact detection embedded in the transducer region of the recording head) or acoustic emission (AE) sensors require a significant amount of head/disk interference to operate effectively due to small signals (low signal-to-noise ratio (SNR)). These schemes generally need modulation to properly detect contact between the recording head and the magnetic recording medium. The relative insensitivity of these detection schemes can lead to higher drive failure rates due to head burnish and/or corrosion or erosion of the read/write head structures.

An embodied piezoelectric contact sensor that includes an integrated head field effect transistor gated with a piezoelectric material can provide for an amplified contact detector current signal that does not rely on the small frictional heating signatures or significant modulation that is needed for AE or thermo-resistive contact sensors. Piezoelectric materials can provide for an amplified detector current signal generated by small compressive forces on the piezoelectric material through the transistor. Such contact sensors can provide for strong contact detection signals on head designs having high pressurization/high stiffness air bearings with very low susceptibility to fly height modulation.

The embodied piezoelectric contact sensor can reduce effective burnish and long-term recording head degradation. The field effect of the transistor can help to both amplify the piezoelectric contact sensor signal and also to reduce background noise. The close proximity of the sensor can allow for an in-head acoustic sensor having a strong signal. Finally, the propagation of compressive stress waves into the recording head far from the head-disk interface (HDI) does not require the piezoelectric contact sensor to be localized at or near the write or reader structure (or ABS).

Figure 3:
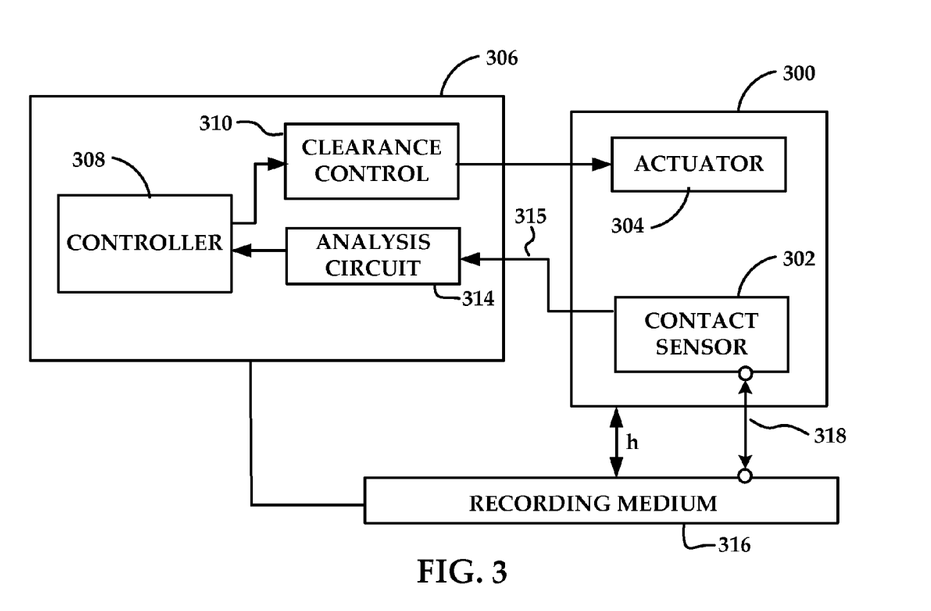
FIG. 3 is a block diagram of a piezoelectric contact sensor contact sensing arrangement according to an example embodiment.

The piezoelectric contact sensor described above may be configured to sense contact and clearance in a number of different ways. In FIG. 3, a block diagram illustrates a piezoelectric contact sensing apparatus according to a first example arrangement. Slider 300 includes piezoelectric contact sensor 302 as described above and clearance actuator 304 (e.g., heater). Slider 300 may include other components not shown, such as a magnetic read head, a magnetic write head, optical components, thermal sensors, etc. Slider 300 is coupled to control circuitry 306 that may be located away from slider 300, e.g., on a main circuit board of a storage device.

Control circuitry 306 includes one or more controllers 308 having logic circuits that control various aspects of apparatus operation. Controller 308 may be a general-purpose microprocessor, application-specific integrated circuit (ASIC), etc. Controller 308 is coupled to clearance control circuit 310 that controls actuator 304. Clearance control circuit 310 may include amplifiers, digital-to-analog converters (DAC), filters, etc. that facilitate applying a signal to actuator 304 in response to a command from controller 308.

Analysis circuit 314 reads back response signal 315 from embodied piezoelectric contact sensor 302. Analysis circuit 314 may include amplifiers, analog-to-digital converters (ADCs), filters, lock-in amplifiers, etc., that facilitate extracting a component of the response signal at the predetermined frequency and supply the results as input to controller 308. For example, analysis circuit 314 may use a trans-impedance amplifier (current to voltage converter) to measure current modulation resulting from a modulated voltage being applied to embodied piezoelectric contact sensor 302.

Response signal 315 can be used to determine contact or pressure 318 between a magnetic head of slider 300 and magnetic recording medium 316. Pressure 318 is indicative of a clearance "h" (or lack of clearance, e.g., contact) between the magnetic head of slider 300 and magnetic recording medium 316. Measured response signal 315 may be used to infer clearance and/or a contact response. Note that the change in response before contact may be used to infer clearance changes in the spacing. Analysis circuit 314 may extract from response signal 315 any combination of current amplitude, voltage amplitude, and phase angle or phase shift (the latter measured can be relative to any applied modulated signal, if present).

Figure 4:
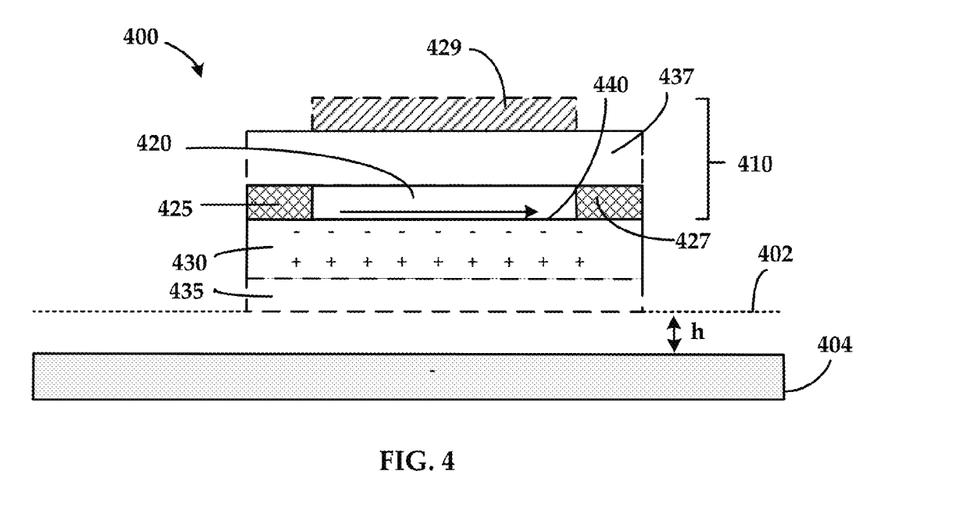
FIG. 4 is a side view of a piezoelectric contact sensor according to an example embodiment.

FIG. 4 is a side view diagram of a piezoelectric contact sensor according to an example embodiment. Piezoelectric contact sensor 400 is shown located at air-bearing surface 402 of the slider (not shown) which is a distance "h" above recording medium 404. In some embodiments, piezoelectric contact sensor 400 can be located closer to or farther from air-bearing surface 402. In other words, it need not be located at air-bearing surface 402 of the slider. In some embodiments, piezoelectric contact sensor 400 can be located in the slider and can be integral to the slider. In some embodiments, piezoelectric contact sensor 400 can be located integral to or near the write head or integral to or near the read head. In some other embodiment, piezoelectric contact sensor 400 can be located between the write head and the read head. In some embodiments, piezoelectric contact sensor 400 can be located in positions other than between the write head and the read head. In various embodiments, piezoelectric contact sensor 400 can be located on or near air-bearing surface 402 of recording medium 404. In other embodiments, piezoelectric contact sensor 400 can be located distant from the air-bearing surface of the recording medium, the read head, and the write head (as will be shown in FIG. 6). In some embodiments, piezoelectric contact sensor 400 can be located from about 5 μm to about 200 μm from air-bearing surface 402.

Piezoelectric contact sensor 400 includes semiconductor device 410. Semiconductor device 410 includes semiconductor material 420 that can define a channel through which current can flow. Semiconductor material 420 can include, but is not limited to, any inorganic or organic semiconductors such as, for example, metal oxide semiconductors (zinc oxide, for example), III-V semiconductor materials (gallium arsenide, for example), or even organic semiconductors such as pentacene or its derivatives. Semiconductor device 410 also includes first terminal (source electrode, for example) 425 and second terminal (drain electrode, for example) 427. Semiconductor material 420 is between and in electrical communication with both first terminal 425 and second terminal 427 as shown in FIG. 4. In some embodiments, semiconductor device 410 comprises a transistor. The transistor can be a field-effect transistor. Some transistors that include a semiconductor material can amplify compressive stress signals induced in a coupled piezoelectric element by a factor of at least 1, at least 10, at least 100, and even at least 1000. In some embodiments, when zinc oxide is used as a semiconductor material, compressive stress signals can be amplified by at least a factor of 1000. As used herein, "between" can include configurations in which the first electrode, the second electrode, and the semiconductor material can be coplanar as shown in FIG. 4. Additionally, other configurations are within the scope of the term "between" and include configurations such as that shown in FIG. 5, wherein at least one of the first electrode or the second electrode are located above (or below) the plane of the semiconductor material but are in electrical communication with the semiconductor material and separated from each other by the semiconductor material.

Piezoelectric contact sensor 400 also includes piezoelectric element 430 coupled to semiconductor material 420. Optionally, an electrically-insulating layer or dielectric layer can be present as a buffer layer between piezoelectric element 430 and recording medium 404. Insulating layer 435 can include, for example, any dielectric materials such as aluminum oxide. Piezoelectric element 430 is configured to modulate the channel current in semiconductor material 420 in response to contact between piezoelectric contact sensor 400 and recording medium 404. In some embodiments, a magnitude of the channel current modulation can be proportional to a degree of compressive stress experienced by the piezoelectric element during contact between piezoelectric contact sensor 400 and recording medium 404. Piezoelectric element 430 includes one or more materials that can convert force from, for example, pressure, acceleration, or strain, into electrical charge. In some embodiments, piezoelectric element 430 can include ceramics and single crystals. Ceramic materials have a piezoelectric constant (sensitivity) that is higher than that of single crystal materials, but their sensitivity can degrade with time. Single crystal piezoelectric elements can be less sensitive but have long term stability. Such materials include, for example, gallium phosphate, quartz, tourmaline, and lead magnesium niobate-lead titanate. Another useful material can be aluminum nitride.

Semiconductor material 420 and piezoelectric element 430 define interface 440 through which they are mechanically and electrically coupled. Piezoelectric element 430 can be configured to induce an increase in surface charge at interface 440 between semiconductor material 420 and piezoelectric element 430. When contact is made between recording medium 404 and piezoelectric contact sensor 400 due to, for example, unevenness in the air-bearing surface of the recording medium (asperities) or micro-waviness in the recording medium, pressure on piezoelectric element 430 creates charge separation (shown in piezoelectric element layer 430). The resulting charge separation can induce a channel in semiconductor material 420 through which current can flow (in the direction of the arrow—from first (source) terminal 425 to second (drain) terminal 427). To increase the sensitivity of piezoelectric contact sensor 400, optional third terminal (gate electrode 429) can be located in proximity to semiconductor material 420—separated by electrically-insulating layer 437. A bias threshold voltage can be applied to third terminal 429 to control the current flow through the current channel in semiconductor material 420 of piezoelectric contact sensor 400.

Figure 5:
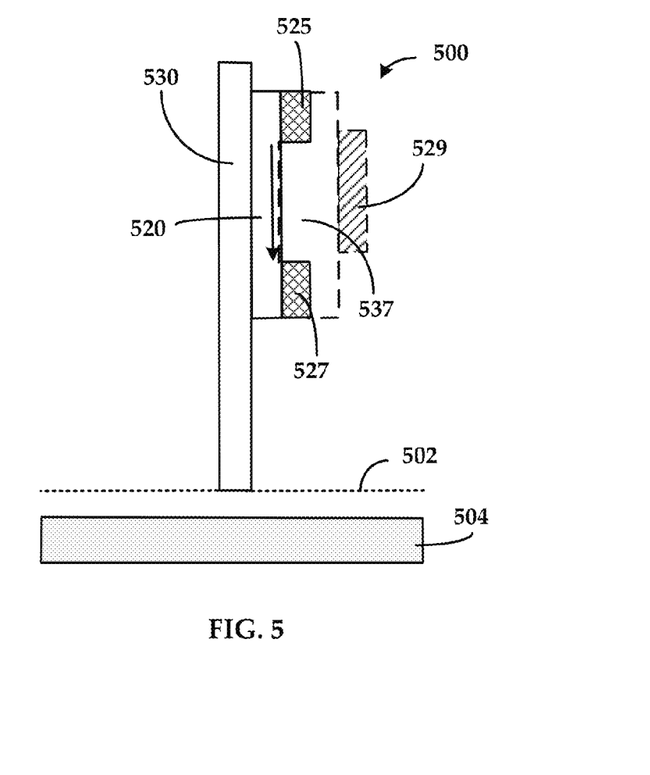
FIG. 5 is a rotated side view of a piezoelectric contact sensor according to another example embodiment.

FIG. 5 is another example embodiment of a piezoelectric contact sensor according to the current disclosure. FIG. 5 shows piezoelectric contact sensor 500 in a different orientation with respect to recording medium 504 than that which is illustrated in FIG. 4. Piezoelectric contact sensor 500 includes a semiconductor device that has piezoelectric element 530 coupled to semiconductor material 520 as shown. First terminal (source electrode) 525 and second terminal (drain electrode) 527 are between and in electrical contact with semiconductor material 520. Optionally, third terminal 529 (gate electrode) is shown disposed upon optional insulator 537 which is between third terminal 529 and semiconductor material 520. Piezoelectric contact sensor 500 is configured so that piezoelectric element 530 is located at or near air-bearing surface 502 of recording medium 504. In this configuration, piezoelectric element 530 can detect force applied to it by recording medium 504 in a transverse direction, a longitudinal direction, or by sideways (bending) force.

Figure 6:
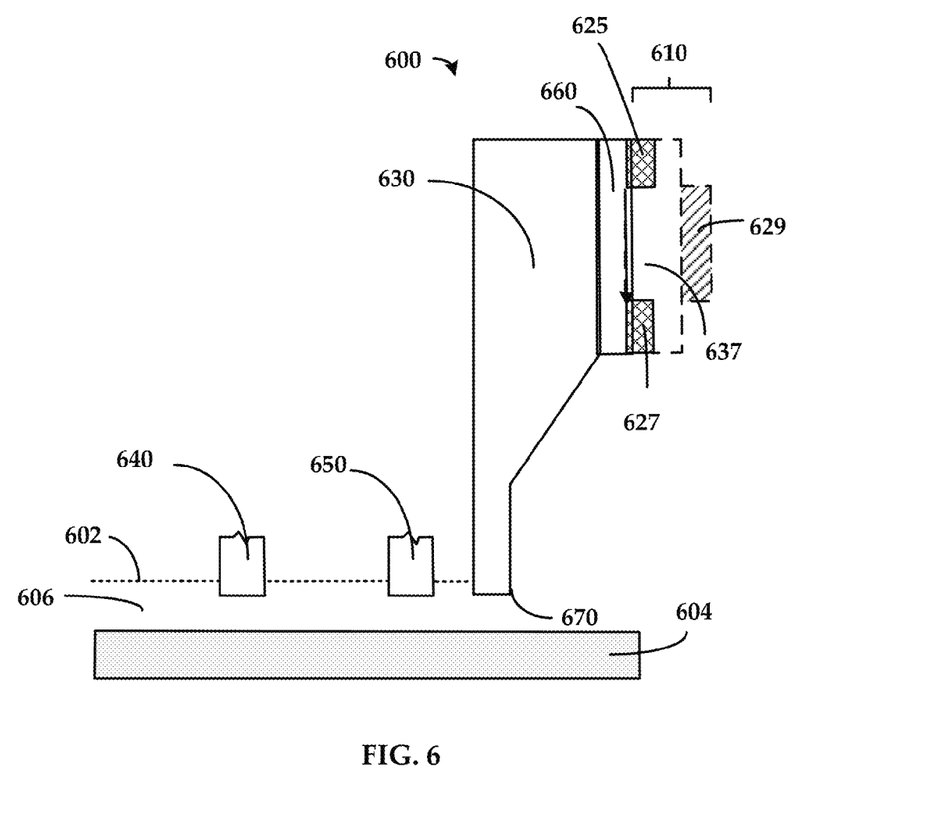
FIG. 6 is a side view of a portion of a recording head that includes a contact pad according to an example embodiment.

FIG. 6 is a side view of a portion of a recording head that includes a contact pad according to an example embodiment. Piezoelectric contact sensor 600 includes semiconductor device 610 defining a channel through which current can flow. Semiconductor device 610 includes semiconductor material 660, first terminal 625, second terminal 627, optionally, third terminal 629, and, optionally, insulator 637 disposed between third terminal 629 and semiconductor material 660. Piezoelectric element 630 is coupled to semiconductor device 610 and is configured to modulate the channel current in response to contact between piezoelectric contact sensor 600 and recording medium 604. Also shown are the tip of read head 640 and the tip of write head 650. Read head 640 and write head 650 may be integral to a slider (not shown in FIG. 6). The slider has air-bearing surface 602. Tip of read head 640 and tip of write head 650 may be at air-bearing surface 602 or may extend into air-bearing 606. In the example embodiment shown in FIG. 6, tip 670 of piezoelectric contact sensor 600 may also extend into air-bearing surface 606 such that it can detect contact of either the tip of read head 640 or the tip of write head 650. In the example embodiment shown in FIG. 6, tip 670 of piezoelectric contact sensor 600 serves as a "contact pad" designed to indicate when tip of read head 640 or tip of write head 650 have contacted recording medium 604. Piezoelectric contact sensor 600 may be part of the slider or may be a separate contact sensor chip.

Other embodiments include an apparatus that has a slider with an air-bearing surface, a write head integral to the slider, and a piezoelectric contact sensor proximal to the slider. The piezoelectric contact sensor includes a semiconductor device that has a semiconductor material defining a channel through which current can flow. The piezoelectric contact sensor can also include a piezoelectric element coupled to the semiconductor material that is configured to modulate the channel current in response to contact between the piezoelectric contact sensor and a recording medium. In this disclosure, the term "proximal to the slider" refers to a location within the slider (otherwise referred to as "integral to the slider"), externally attached to or mounted on the slider, or located in a position that is in vibrational communication with the slider. By "vibrational communication with," it is meant that any compressive vibrations produced by the slider can be detected by the piezoelectric contact sensor. These compressive vibrations can be conducted through any medium such as, but not limited to, the material of the slider, the air in the air-bearing surface, or any additional conduit through which compressive vibrations may be conducted.

Figures 7A, 7B:
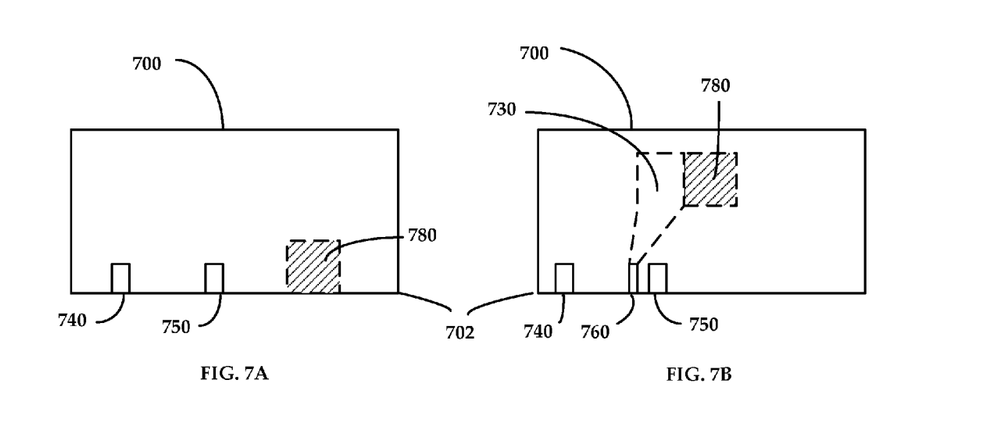
FIGS. 7A-7D are cross-sectional schematic drawings of example embodiments of sliders having disclosed piezoelectric contact sensors therein (FIGS. 7A-7C) or thereupon (FIG. 7D).

FIGS. 7A-7D illustrate example embodiments of disclosed sliders. Sliders 700 in FIGS. 7A-7D include a read head 740 and a write head 750 at air-bearing surface 702 of the sliders. Disclosed piezoelectric contact sensors 780 are also shown in FIGS. 7A-7D. Piezoelectric contact sensor 780 includes a semiconductor device that has a semiconductor material defining a channel through which current can flow. Piezoelectric contact sensor 780 also includes a piezoelectric element coupled to the semiconductor material that is configured to modulate the channel current in response to contact between the contact sensor and a recording medium. In FIG. 7A, piezoelectric contact sensor 780 is integral to slider 700 and is also located at air-bearing surface 702 of slider 700. Since it is integral to slider 700, piezoelectric contact sensor 780 is in vibrational communication with write head 750 (and read head 740). Slider 700 illustrated in FIG. 7B is also integral to slider 700 but is located distant from air-bearing surface 702. Tip 760 of piezoelectric element 730 extends to air-bearing surface 702 between read head 740 and write head 750. In other embodiments, tip 760 of piezoelectric element 730 can be located at air-bearing surface 702 on either side of write head 750 or read head 740 and may not necessarily be located between the read head and write head.

Figure 7C:
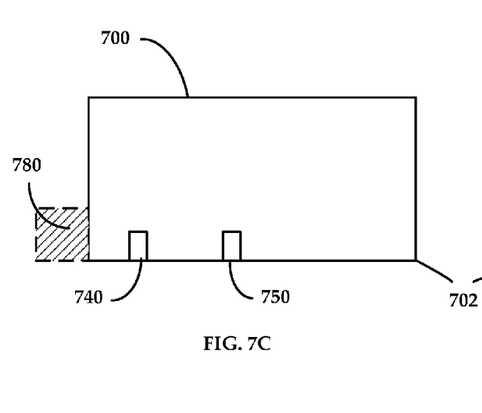
Figure 7D:
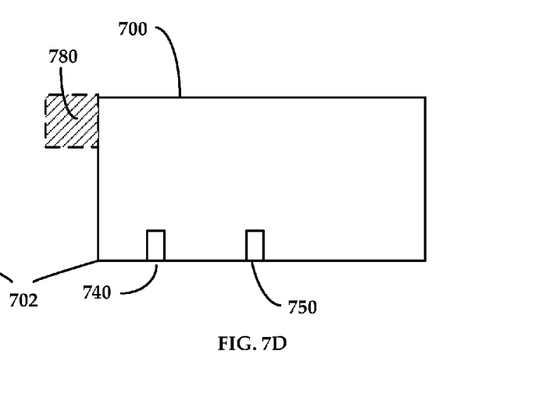

FIG. 7C shows yet another example embodiment in which piezoelectric contact sensor 780 is located external to slider 700 but is in vibrational communication (and also in contact with) slider 700. Piezoelectric contact sensor 780 is also located at air-bearing surface 702. FIG. 7D shows an example embodiment similar to that illustrated in FIG. 7C but located distant from air-bearing surface 702. In both example embodiments illustrated in FIGS. 7C and 7D, externally-mounted piezoelectric contact sensor 780 can be referred to as a "contact sensor chip." FIGS. 7A-7D show only four of many possible example embodiments of a disclosed apparatus that includes a slider, a write head (optionally, also a read head), and a disclosed piezoelectric contact sensor.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An apparatus comprising:
    a contact sensor of a recording head that includes a semiconductor device, the recording head comprising a write head and a read head, and the semiconductor device comprising:
        a semiconductor material that defines a channel through which channel current can flow; and
        a piezoelectric element in direct contact with the semiconductor material and configured to modulate the channel current in response to compressive stress waves at the contact sensor.

2. An apparatus according to claim 1, wherein the compressive stress waves are due to pressure changes by read or write head actuation at the recording head, resonant modulation of an air-bearing defined between the recording head and an adjacent recording medium, or contact between the recording head and a recording medium.

3. An apparatus according to claim 1, wherein the contact sensor is located at or near an air-bearing surface of the recording head.

4. An apparatus according to claim 1, wherein the contact sensor is located distant from an air-bearing surface of the recording head.

5. An apparatus according to claim 1, wherein the contact sensor is located from about 5 μm to about 200 μm from an air-bearing surface of the recording head.

6. An apparatus according to claim 1, wherein the semiconductor material and the piezoelectric element define an interface therebetween, and the piezoelectric element is configured to induce an increase in surface charge at the interface in response to compressive contact between the piezoelectric element and a recording medium.

7. An apparatus according to claim 1, wherein a magnitude of the channel current modulation is proportional to a degree of compressive stress experienced by the piezoelectric element during contact between the contact sensor and a recording medium.

8. An apparatus according to claim 1, comprising circuitry coupled to the contact sensor and configured to detect contact between the contact sensor and a recording medium.

9. An apparatus according to claim 1, comprising circuitry coupled to the contact sensor and configured to detect contact between the contact sensor and an asperity of a recording medium.

10. An apparatus according to claim 1, wherein the semiconductor device defines a two-terminal device comprising a first terminal and a second terminal, and wherein the semiconductor material is between and in electrical communication with both the first terminal and the second terminal.

11. An apparatus according to claim 10, wherein the channel current flows between the first terminal and the second terminal.

12. An apparatus according to claim 1, wherein the semiconductor device defines a three-terminal device comprising:
    a first terminal and a second terminal, wherein the semiconductor material is between and in electrical communication with both the first terminal and the second terminal;
    a third terminal configured to receive a threshold voltage that controls the current flow through the channel; and
    an insulator between the third terminal and the semiconductor device.

13. An apparatus according to claim 1, wherein the semiconductor device comprises a transistor.

14. An apparatus according to claim 1, wherein the semiconductor device comprises a field-effect transistor.

15. An apparatus according to claim 1, configured to amplify compressive stress signals induced in the piezoelectric element by a factor of at least 100.

16. An apparatus according to claim 1, configured to amplify compressive stress signals induced in the piezoelectric element by a factor of at least 1000.

17. An apparatus according to claim 1, wherein a tip of the contact sensor comprises a contact sensor pad.

18. An apparatus comprising:
   a slider of a recording head having an air-bearing surface;
   a write head of the recording head integral to the slider; and
   a contact sensor proximal to the slider that includes a semiconductor device comprising a semiconductor material that defines a channel through which channel current can flow, and a piezoelectric element in direct contact with the semiconductor material and configured to modulate the channel current in response to compressive waves at the contact sensor.

19. An apparatus according to claim 18, wherein the contact sensor is located in vibrational communication with the air-bearing surface of the slider.

20. An apparatus according to claim 18, wherein the contact sensor is located in at the air-bearing surface of the slider.

21. The apparatus of claim 1, wherein the semiconductor device further comprises:
   a source and a drain, the semiconductor material disposed between the source and drain; and
   the piezoelectric element is in contact with the source, the drain, and the semiconductor material.

22. The apparatus of claim 1, wherein the semiconductor device further comprises:
   a source and a drain, the semiconductor material disposed between the source and drain;
   the piezoelectric element is in contact with the source, the drain, and the semiconductor material; and
   the semiconductor device is arranged on the recording head such that the piezoelectric element comprises a media-facing surface.

23. The apparatus of claim 18, wherein the semiconductor device further comprises:
   a source and a drain, the semiconductor material disposed between the source and drain; and
   the piezoelectric element is in contact with the source, the drain, and the semiconductor material.

24. The apparatus of claim 18, wherein the semiconductor device further comprises:
   a source and a drain, the semiconductor material disposed between the source and drain;
   the piezoelectric element is in contact with the source, the drain, and the semiconductor material; and
   the semiconductor device is arranged on the recording head such that the piezoelectric element comprises a media-facing surface.

* * * * *